(12) United States Patent
Serena et al.

(10) Patent No.: US 10,597,849 B2
(45) Date of Patent: Mar. 24, 2020

(54) METHOD AND SYSTEM FOR BURYING A PIPELINE IN A BED OF A BODY OF WATER

(71) Applicant: SAIPEM S.p.A., San Donato Milanese (IT)

(72) Inventors: Alberto Serena, Ponzano Veneto (IT); Diego Lazzarin, Treviso (IT); Salvatore Torcivia, Noventa Vicentina (IT); Massimo Bellin, Mestre (IT)

(73) Assignee: SAIPEM S.p.A., San Donato Milanese (IT)

( * ) Notice: Subject to any disclaimer, the term of this patent is extended or adjusted under 35 U.S.C. 154(b) by 45 days.

(21) Appl. No.: 15/758,237

(22) PCT Filed: Sep. 9, 2016

(86) PCT No.: PCT/IB2016/055378
§ 371 (c)(1),
(2) Date: Mar. 7, 2018

(87) PCT Pub. No.: WO2017/042723
PCT Pub. Date: Mar. 16, 2017

(65) Prior Publication Data
US 2019/0226177 A1    Jul. 25, 2019

(30) Foreign Application Priority Data
Sep. 11, 2015   (IT) .................. 102015509820

(51) Int. Cl.
*F16L 1/16*   (2006.01)
*F16L 1/23*   (2006.01)
(Continued)

(52) U.S. Cl.
CPC .............. *E02F 5/104* (2013.01); *B63B 35/03* (2013.01); *E02F 5/145* (2013.01); *E02F 9/264* (2013.01);
(Continued)

(58) Field of Classification Search
CPC ..... F16L 1/16; F16L 1/165; F16L 1/23; E02F 5/105; E02F 5/106; E02F 5/107; E02F 5/108; E02F 5/109; H02G 1/10
(Continued)

(56) References Cited

U.S. PATENT DOCUMENTS 3,822,558 A     7/1974  Blankenship
3,924,896 A *  12/1975  Blankenship ............. E02F 5/08
                                                    299/18
(Continued)

FOREIGN PATENT DOCUMENTS

EP   2 331 754 B1    5/2012
EP   2 501 864 B1    1/2015
(Continued)

OTHER PUBLICATIONS

Notification Concerning Submission, Obtention or Transmittal of Priority Document for International Application No. PCT/IB2016/055378 dated Oct. 26, 2016.
(Continued)

*Primary Examiner* — Frederick L Lagman
(74) *Attorney, Agent, or Firm* — Neal, Gerber & Eisenberg LLP (57) ABSTRACT

A method for burying a pipeline in a bed of a body of water which includes: making a trench with a bottom surface in a bed of a body of water via a bed working vehicle advanced in an advancing direction; advancing a floating unit in the body of water; releasing a pipeline in the body of water via a tensioner and along a lay device tilted in an adjustable manner and constrained to the floating unit; guiding the pipeline to the bottom surface of the trench via a guide vehicle advanced on the bed of the body of water; and
(Continued)

controlling the tensioner, the floating unit, the lay device, the bed working vehicle, and the guide vehicle to minimize stress along the pipeline.

36 Claims, 7 Drawing Sheets (51) Int. Cl.
| | |
|---|---|
| *E02F 5/10* | (2006.01) |
| *H02G 1/10* | (2006.01) |
| *B63B 35/03* | (2006.01) |
| *E02F 5/14* | (2006.01) |
| *E02F 9/26* | (2006.01) |
| *F16L 57/02* | (2006.01) |
| *F16L 1/19* | (2006.01) |
| *F16L 1/235* | (2006.01) |
| *F17D 1/02* | (2006.01) |
| *F16L 1/20* | (2006.01) |

(52) U.S. Cl.
CPC ................. *F16L 1/19* (2013.01); *F16L 1/23* (2013.01); *F16L 1/235* (2013.01); *F16L 57/02* (2013.01); *F17D 1/02* (2013.01); *H02G 1/10* (2013.01); *F16L 1/16* (2013.01); *F16L 1/20* (2013.01)

(58) Field of Classification Search
USPC .............................. 405/164, 165, 166, 168.4
See application file for complete search history.

(56) References Cited

U.S. PATENT DOCUMENTS

| | | | | |
|---|---|---|---|---|
| 4,037,422 A | * | 7/1977 | DEBoer | ................. E02F 5/104 |
| | | | | 405/160 |
| 4,091,629 A | * | 5/1978 | Gunn | ................. E02F 5/104 |
| | | | | 405/163 |
| 4,269,540 A | * | 5/1981 | Uyeda | ................. B63B 35/03 |
| | | | | 226/172 |
| RE30,846 E | * | 1/1982 | Lang | ................. F16L 1/203 |
| | | | | 405/168.3 |
| 4,410,297 A | | 10/1983 | Lynch | |
| 4,538,937 A | | 9/1985 | Lynch | |
| 4,575,280 A | * | 3/1986 | Hemphill | ................ E02F 5/104 |
| | | | | 405/159 |
| 4,588,329 A | | 5/1986 | Gilchrist, Jr. | |
| 4,710,059 A | | 12/1987 | Hazlegrove et al. | |
| 4,714,379 A | * | 12/1987 | Gilchrist, Jr. | ............. E02F 5/06 |
| | | | | 405/158 |
| 4,992,000 A | * | 2/1991 | Doleshal | ................ E02F 5/104 |
| | | | | 405/158 |
| 5,823,712 A | * | 10/1998 | Kalkman | ................ F16L 1/225 |
| | | | | 405/165 |
| 5,971,665 A | * | 10/1999 | Hughes | .................... H02G 1/10 |
| | | | | 405/159 |
| 6,364,573 B1 | * | 4/2002 | Baugh | ....................... F16L 1/19 |
| | | | | 405/165 |
| 6,733,208 B2 | * | 5/2004 | Stockstill | ................ B63B 35/03 |
| | | | | 405/166 |
| 8,899,877 B2 | * | 12/2014 | Lazzarin | ................... E02F 5/04 |
| | | | | 405/159 |
| 8,944,725 B2 | * | 2/2015 | Lazzarin | ............... E02D 17/086 |
| | | | | 405/159 |
| 2004/0031174 A1 | | 2/2004 | Ballard | |
| 2012/0057940 A1 | | 3/2012 | Lazzarin et al. | |
| 2015/0115597 A1 | | 4/2015 | Lorraine | |

FOREIGN PATENT DOCUMENTS

| | | |
|---|---|---|
| GB | 2 265 685 A | 10/1993 |
| WO | WO 01/70564 A1 | 9/2001 |
| WO | WO 2009/141409 A1 | 11/2009 |
| WO | WO 2010/139621 A2 | 12/2010 |
| WO | WO 2013/155172 A1 | 10/2013 |

OTHER PUBLICATIONS

International Search Report and Written Opinion for International Application No. PCT/IB2016/055378 dated Mar. 17, 2017.

* cited by examiner

METHOD AND SYSTEM FOR BURYING A PIPELINE IN A BED OF A BODY OF WATER

PRIORITY CLAIM

This application is a national stage application of PCT/IB2016/055378, filed on Sep. 9, 2016, which claims the benefit of and priority to Italian Patent Application No. 102015000050982, filed on Sep. 11, 2015, the entire contents of which are each incorporated by reference herein.

TECHNICAL FIELD

The present disclosure relates to a method for burying a pipeline in a bed of a body of water.

In particular, the present disclosure relates to a method for burying a pipeline for transporting hydrocarbons in the bed of the body of water.

BACKGROUND

Pipelines for transporting hydrocarbons are composed of pipe sections joined together to cover overall lengths in the order of hundreds of kilometres. The pipe sections have a unit length, generally 12 meters, and relatively large diameters of between 0.2 and 1.5 metres. Each pipe section comprises a steel cylinder, a coating in a polymer material that has the function of protecting the steel pipe, and a possible further coating in Gunite or concrete, the function of which is to weigh down the pipeline in underwater applications.

Typically, pipelines are buried close to shore approaches and in relatively shallow waters to protect them from damage caused by blunt instruments such as, for example, anchors and fishing nets. Sometimes, pipelines are buried to ensure protection against natural agents such as wave motion and the current, which could overstress the pipelines. As such, when the pipeline is laid on the bed of the body of water it can happen that the pipeline is placed with a span (i.e., the pipeline has a raised section with respect to the bed located between two support areas). In the described configuration, the pipeline is particularly exposed to wave motion and the current, and offers relatively little resistance to displacements induced by these natural agents. In other cases, the need for burying is due to thermal instability problems that cause deformation of the pipeline (upheaval/lateral buckling). In yet other cases, it is necessary to protect the pipeline from the mechanical action of ice that, in particularly shallow waters, can scour the bed.

To bury a pipeline in a bed of a body of water, it is necessary to dig a trench, place the pipeline on the bottom surface of the trench and bury the pipeline. Different techniques have been proposed for this purpose.

In general, the laying of a pipeline in a body of water is carried out by a floating unit, which, while the floating unit proceeds along a predetermined route, releases the pipeline in the body of water by a lay device. The pipeline has a spanned section between the lay device and the bottom of the trench or the bed of the body of water.

There are substantially two burying methods: the pre-trenching method, where a trench is dug and the pipeline is laid directly on the bottom surface of the trench, and the post-trenching method, in which the pipeline is laid on the bed of the body of water and the trench is then excavated directly beneath the pipeline.

There are many trench excavation methods, including: dragging a plough that forms a furrow in the bed of the body of water; advancing a milling cutter to break up a strip of the bed of the body of water and devices configured to remove the strip of broken-up bed, such as Archimedean screws for example; and advancing a milling cutter to break up a strip of the bed of the body of water and fluidization devices to make the pipeline sink into the broken-up and "fluidized" ground mass.

It is also known to support the lateral surfaces of trenches with movable lateral support walls when the trenches are characterized by very high depth/width ratios, to prevent the trench caving in before having correctly positioned the pipeline in the trench.

Furthermore, when the span between the lay device and the bottom of the trench is relatively very long, the lateral walls must also be relatively particularly long.

The following documents reveal the above-indicated known techniques: PCT Patent Published Application No. WO 2009/141,409 A2, European Patent No. EP 2,501,864 B1, U.S. Pat. No. 4,710,059, U.S. Patent Application Publication No. 2012/0057940 A1, European Patent No. EP 2,331,754, U.S. Pat. Nos. 3,822,558, and 4,588,329.

It is evident that the difficulties associated with the burying of the pipeline as well as the energy necessary for the burying increase with the burying depth and with the span length of the pipeline. Further critical problems arise when laying is carried out in relatively difficult environments, such as the Artic Sea for example, where the scouring caused by icebergs is quite considerable and imposes burying the pipeline relatively very deeply. In addition, the relatively short season available for laying the pipeline dictates carrying out the laying relatively very quickly. It is also evident that the severe restrictions imposed by the environmental conditions must not be detrimental to the integrity of the pipeline.

SUMMARY

One advantage of the present disclosure is to provide a method for burying a pipeline in a bed of a body of water that is relatively rapid and immediately secures the pipeline, limits excessive stress on the pipeline, and enables reducing the span of the pipeline between the floating unit and the bed of the body of water.

In accordance with the present disclosure, a method is provided for burying a pipeline in a bed of a body of water, the method comprising the steps of:
  making a trench with a bottom surface in a bed of a body of water by a bed working vehicle advanced in an advancing direction;
  advancing a floating unit in the body of water substantially in the advancing direction;
  releasing the pipeline in a controlled manner from the floating unit by at least one tensioner and along a tiltable lay device mounted on the floating unit so that the pipeline forms one single curve with an upward-facing concavity between the lay device and the bottom surface of the trench;
  guiding the pipeline to the bottom surface of the trench by a guide vehicle advanced along the trench substantially in the advancing direction; and
  controlling the floating unit, the bed working vehicle, and the guide vehicle as a function of the advancing of the pipeline along the lay device to minimize stress along the pipeline in the section extending between the floating unit and the bottom surface of the trench.

In this way, the pipeline is constrained both to the floating unit and to the guide vehicle to increase the positioning precision of the pipeline and therefore reduce the width of the trench, to the benefit of relatively faster burying. Furthermore, the maneuvering of the floating unit, the lay device, the tensioners, and the bed working vehicle are managed in a coordinated manner to reduce stress on the pipeline to a minimum and reduce the span between the lay device and the bottom surface of the trench.

In particular, the step of guiding the pipeline includes coupling the guide vehicle to the pipeline by at least one guide device, the position of which is adjustable with respect to the guide vehicle by force and/or position with respect to the guide vehicle.

The independent adjustment of the guide device with respect to the guide vehicle enables accurate pipeline guidance that, to a certain extent, is independent of the position of the guide vehicle.

In particular, the guide device is adjustable in at least one direction between a direction parallel to the advancing direction and a burying direction perpendicular to the advancing direction.

The adjustment in at least one of the above-mentioned directions is precisely what enables freeing the guidance of the pipeline from the position of the guide vehicle with respect to the pipeline. The possibility of adjusting the position of the guide device in both directions broadens the range of relative positions between the guide vehicle and the pipeline in which the guide device is able to guide the pipeline in an effective manner.

In particular, the method provides for acquiring the average advancing speed of the pipeline along the lay device.

Generally, the pipeline is gradually laid as the pipeline is assembled. The assembly is performed stepwise and is an operation generally characterized by a relatively low average speed. In these embodiments, the acquiring of this average speed enables having a precise reference point on which to regulate the other operations of the method.

In particular, the method provides for controlling the average advancing speed of the bed working vehicle and of the guide device as a function of the average advancing speed of the pipeline along the lay device.

In accordance with one embodiment of the present disclosure, the method provides for controlling the advancement of the bed working vehicle and the guide vehicle in synchronism with the advancement of the pipeline along the lay device. In particular, the synchronized advancement contemplates advancing the bed working vehicle and the guide vehicle in step with the advancement of the pipeline.

This principle is also applied to the floating unit, which is advanced in synchronism with the advancement of the pipeline along the lay device.

In accordance with the present disclosure, the pipeline comprises an external tubular portion, which is configured to make the pipeline relatively heavier and is discontinuous along the generatrices of the pipeline. This configuration enables bending the pipeline more without damaging the external tubular portion.

In a first embodiment, the external tubular portion has a plurality of rings alternating with annular grooves, while in a second embodiment the external tubular portion has a helical groove and a series of coils separated from each other by the helical groove.

A further advantage of the present disclosure is to provide a system configured to bury a pipeline in a bed of a body of water that relatively quickly secures the pipeline and protects the pipeline from relatively excessive stress.

In accordance with the present disclosure, a system configured to bury a pipeline in a bed of a body of water comprises:
  a bed working vehicle advanced in an advancing direction and configured to make a trench with a bottom surface in a bed of a body of water;
  a floating unit advanced in the body of water substantially in the advancing direction;
  a tiltable lay device mounted on the floating unit so that the pipeline forms one single curve with an upward-facing concavity between the lay device and the bottom surface of the trench;
  at least one tensioner configured to release the pipeline in a controlled manner;
  a guide vehicle advanced along the trench substantially in the advancing direction and configured to guide the pipeline to the bottom surface of the trench; and
  a control unit configured to control the floating unit, the bed working vehicle, and the guide vehicle as a function of the advancement of the pipeline along the lay device to minimize stress along the pipeline in the section extending between the floating unit and the bottom surface of the trench.

Additional features and advantages are described in, and will be apparent from the following Detailed Description and the figures.

BRIEF DESCRIPTION OF THE DRAWINGS

Further characteristics and advantages of the present disclosure will become clear from the description that follows of a non-limitative embodying example, with reference to the figures in the accompanying drawings, in which.

DETAILED DESCRIPTION

Figure 1:
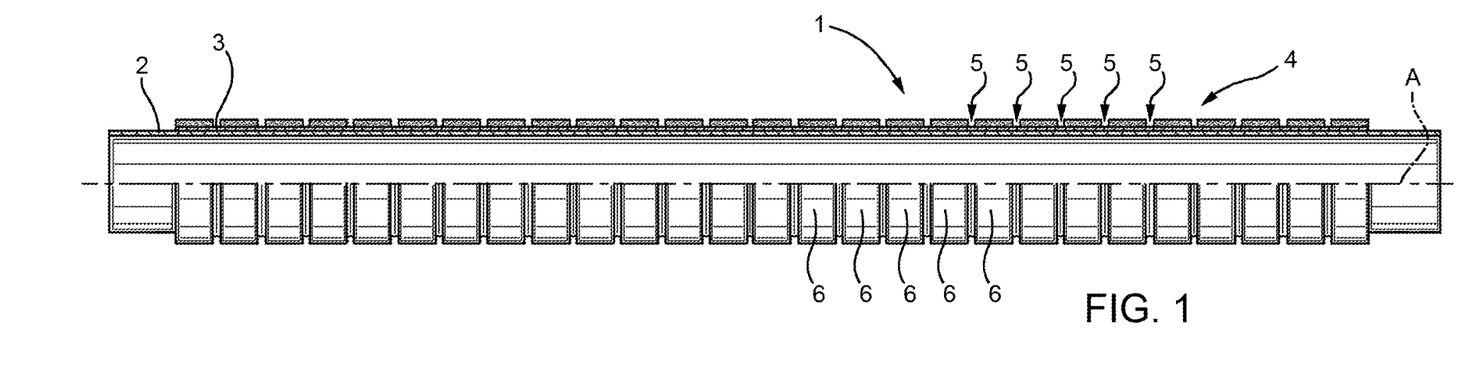
FIG. 1 is a side elevation view, with parts in section and parts removed for clarity, of a pipeline made in accordance with the present disclosure.

In FIG. 1, reference numeral 1 indicates a pipeline as a whole, which extends along a longitudinal axis A. The pipeline 1 comprises an internal tubular portion 2, defined by a metal cylinder, an intermediate tubular portion 3, defined by a protective polymer layer, and an external tubular portion 4, defined by a layer of concrete or Gunite and having the function of weighing down the pipeline 1.

In the case shown in FIG. 1, the external tubular portion 4 of the pipeline 1 has annular grooves 5 so as to form a plurality of rings 6 spaced out respectively from each other and which, in the case shown, have a constant distribution pitch.

Figure 2:
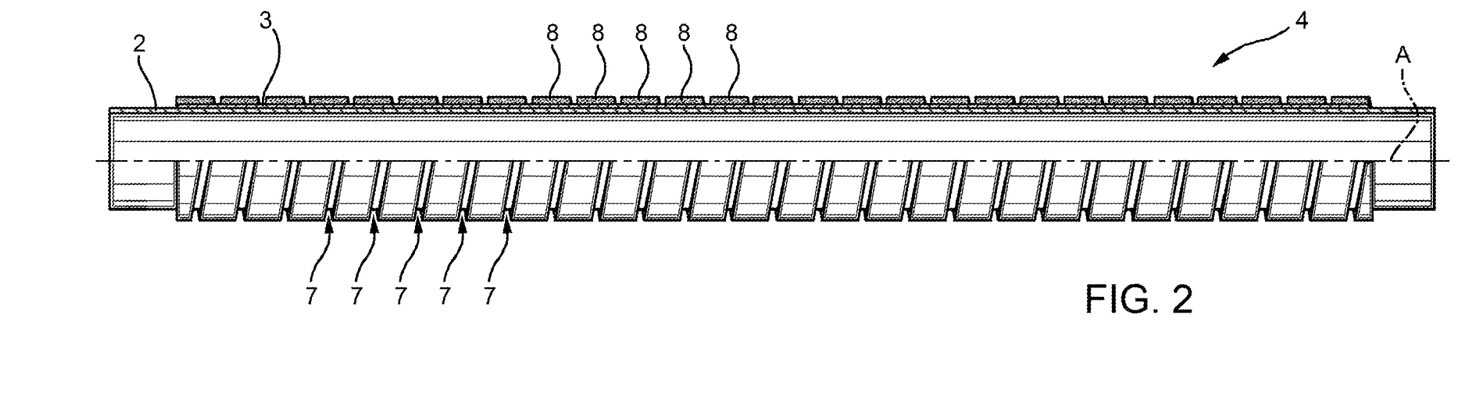
FIG. 2 is a side elevation view, with parts in section and parts removed for clarity, of a variant of the pipeline in FIG. 1.

In the variant in FIG. 2, the external tubular portion 4 of the pipeline 1, has a helical groove 7 so as to define a series of coils 8 spaced apart from each other.

In both embodiments, the external tubular portion 4 is discontinuous along the generatrices of the outer face of the pipeline 1 and enables bending of the pipeline 1 with relatively small radii of curvature without causing the external tubular portion 4 to crumble and/or damage to the pipeline 1.

Figure 3:
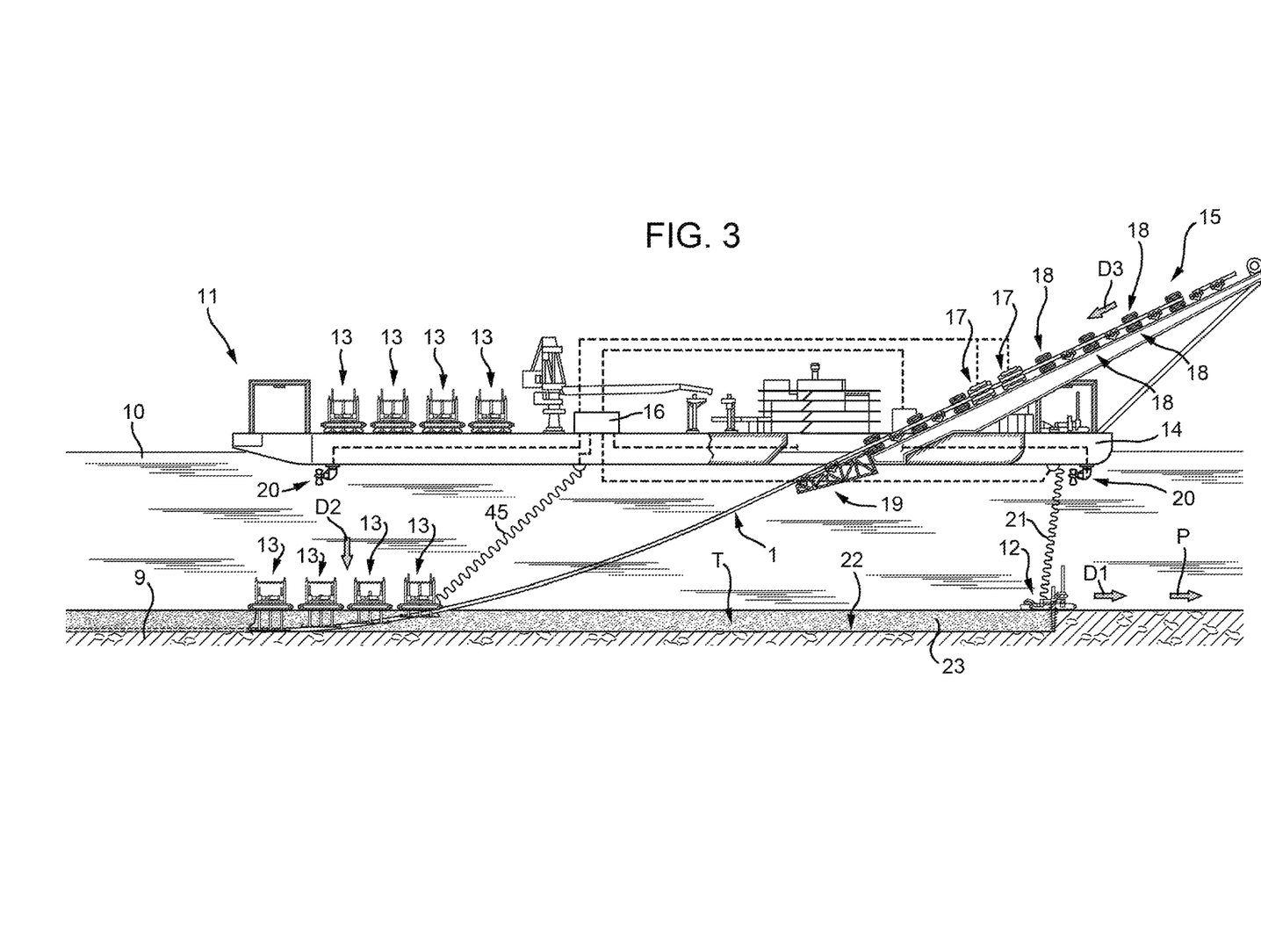
FIG. 3 is a schematic side elevation view, with parts removed for clarity, of a system configured to lay a pipeline on the bed of the body of water in accordance with the present disclosure.

Referring to FIG. 3, the present disclosure is directed to a system configured to bury the pipeline 1 in a bed 9 of a body of water 10. The system lays and simultaneously buries the pipeline 1 along a path P. The system comprises a floating unit 11, a bed working vehicle 12 advanced in an advancing direction D1 parallel to the path P, and a plurality of guide vehicles 13 also advanced in the advancing direction D1 along the path P. The floating unit 11 comprises a floating structure 14, a lay device 15 installed on the floating structure 14, and a control unit 16, which is connected to the bed working vehicle 12 and to the guide vehicles 13. In greater detail, the floating structure 14 is configured to transport bed working vehicles 12 and the guide vehicles 13. The lay device 15 is configured to operate with a maximum inclination of 40° for laying the pipeline 1 on beds at a depth of between 15 meters and 50 meters. In particular, the inclination of the lay device 15 is in the range between 10° and 40°, such as between 15° and 35°, and even more specifically between 15° and 30°. The lay device 15 enables creating a single curve with an upward-facing concavity in the pipeline 1 and the large inclination of the lay device 15 enables creating curves with adequate radii of curvature despite the shallowness of the bed 9. In the case shown, the lay device 15 comprises two tensioners 17, a plurality of work stations 18, and a launch ramp 19.

The floating unit 11 is equipped with a dynamic positioning system which is part of the control unit 16 and comprises, in this case, thrusters 20, which are controlled by the control unit 16. Alternatively, in shallow waters, the floating unit 11 is maneuvered by anchors (not shown in the accompanying drawings).

The function of the bed working vehicle 12 is to break up a portion of the bed 9 without removing the broken-up material. In the case shown, the bed working vehicle 12 is advanced in the advancing direction D1, does not directly interact with the laying of the pipeline 1, and is connected to the control unit 16 by an umbilical 21. In other words, the bed working vehicle 12 performs preconditioning of the bed 9 and is advanced in front of the guide vehicles 13 at a predetermined design distance from the guide vehicles 13.

It should be appreciated that the design distance is variable and constitutes a compensation: for example, if the bed working vehicle 12 is forced to stop for a relatively short period due to a problem, it is not necessary to interrupt the laying and burying operations of the pipeline 1. In other words, the bed working vehicle 12 can be advanced in a continuous manner even when the laying of the pipeline 1 is performed stepwise. Vice versa, relatively short interruptions in preconditioning operations or temporary slowdowns of the bed working vehicle 12 do not affect laying operations. The design distance between the bed working vehicle 12 and the first of the guide vehicles 13 constitutes a compensation for possible different advancing speeds of the bed working vehicle 12 and the guide vehicles 13.

Figure 6:
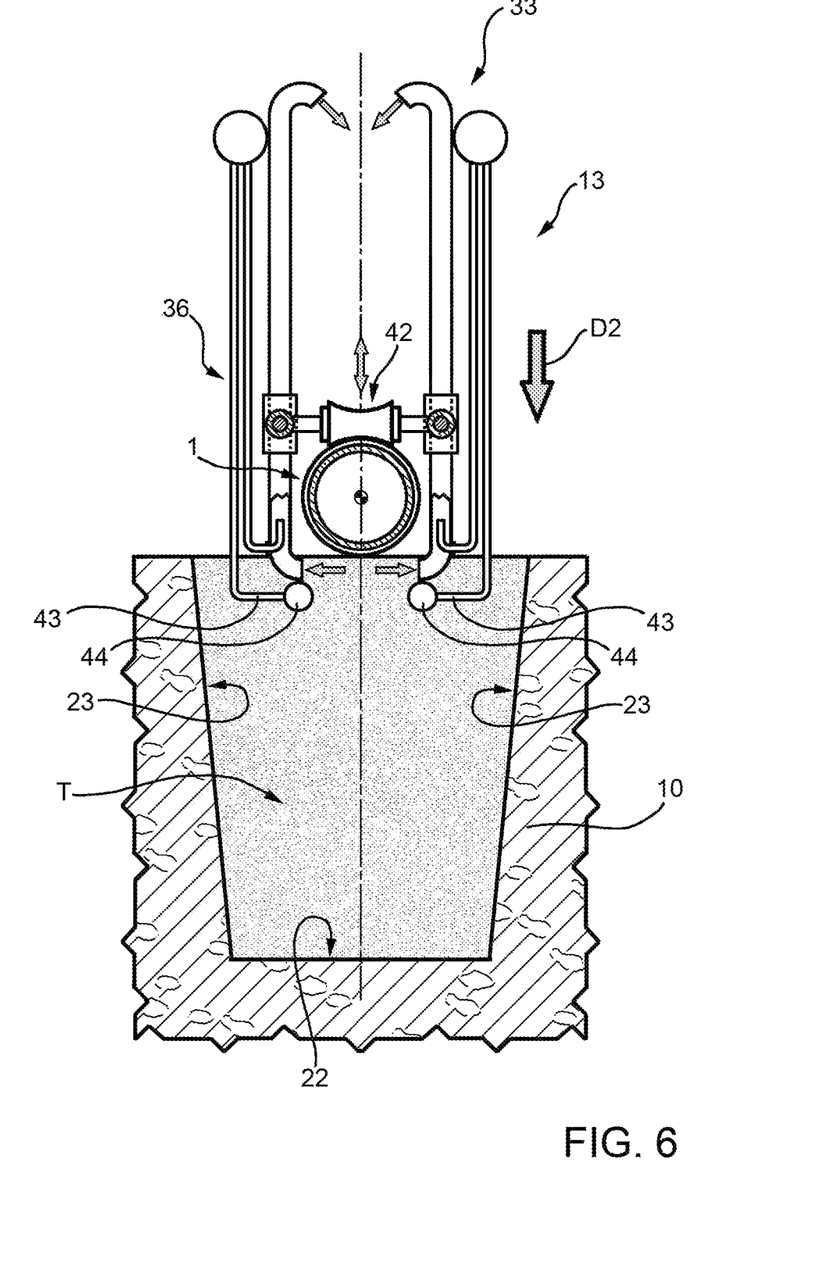
FIG. 6 is a front view, with parts in section and parts removed for clarity, of the guide vehicle in FIG. 5 in an operating step.

Referring to FIG. 6, the trench T has a bottom surface 22 and two side surfaces 23, where the space delimited by the bottom surface 22 and the side surfaces 23 is full of broken-up material.

For the purposes of this description, the term "trench" identifies both a true trench where the broken-up material has been removed and a "virtual" trench where the material has not been removed, but only broken up.

Figure 4:
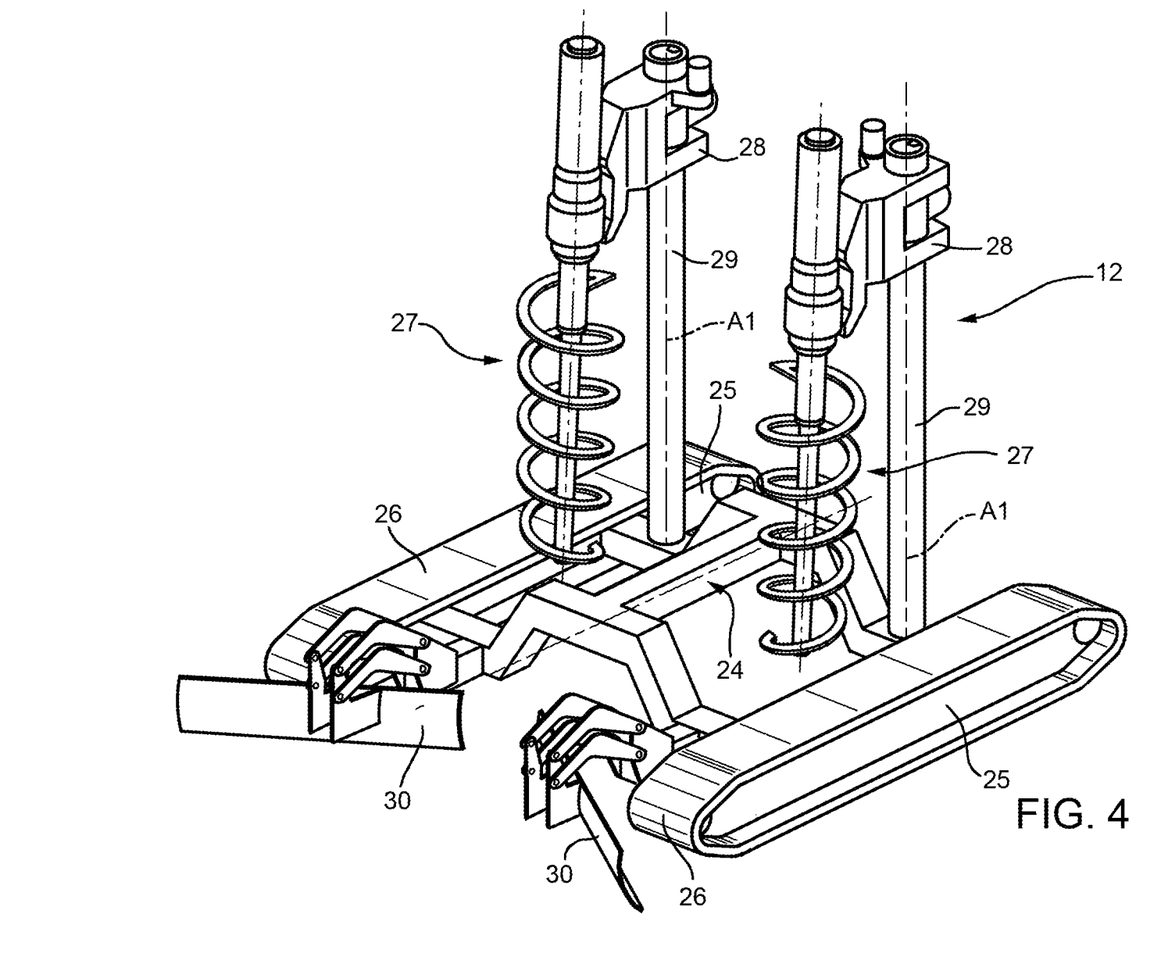
FIG. 4 is a perspective view, with parts removed for clarity, of a bed working vehicle for the bed of the body of water.

Referring to FIG. 4, the bed working vehicle 12 comprises a frame 24, two variable flotation containers 25, two advancing devices 26 (in this case motorized belts 26 wrapped around the containers 25), and two tools 27 (the working positions of which can be adjusted with respect to the frame 24). In FIG. 4, the tools 27 are arranged in the rest position. In the working position, the tools 27 are entirely or partially arranged beneath the advancing devices 26. In this example, each tool 27 is mounted on a slide 28 sliding along a guide 29 of the frame 24 and selectively rotatable about the axis A1 of the guide 29.

The bed working vehicle 12 also comprises blades 30 mounted on the frame 24 and configured to prevent material accumulating along the edges of the trench T (FIG. 3). For further details on the bed working vehicle 12, please make express reference to FIGS. 4 to 7 and the associated description from page 8, line 8 to page 10, line 28 of PCT Published Patent Application No. WO 2009/141,409, which are incorporated for reference in this description.

Figure 5:
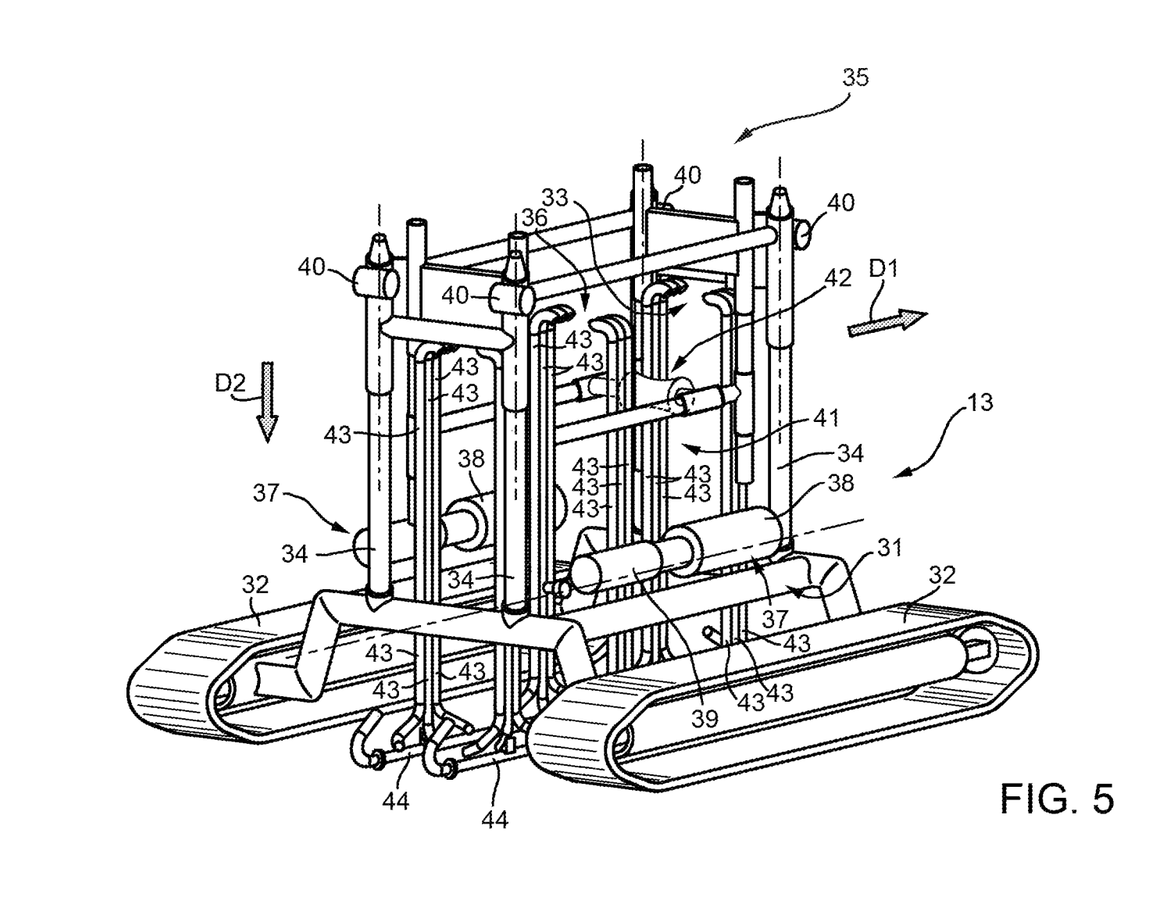
FIG. 5 is a perspective view, with parts removed for clarity, of a guide vehicle of the pipeline.

Referring to FIG. 5, each guide vehicle 13 is advanced in direction D1 and has the function of burying and guiding the pipeline 1 in the burying step. Each guide vehicle 13 comprises a frame 31, two advancing devices 32, in this case two motorized belts configured to be arranged on opposite sides with respect to the pipeline 1, and a burying device 33. The burying device 33 comprises four guides 34, each of which fixed to the frame 31, a slide 35 that is movable along the guides 34 in direction D2, a fluidization unit 36 to fluidize the broken-up ground mass, and two pumping units 37, each of which is fixed to the frame 31 and comprises a pump 38, such as a centrifugal pump with a lengthened suction tube (not shown in the accompanying drawings) configured to draw clean water, and an electric motor 39 configured to operate the respective pump 38. The fluidization unit 36 is fixed to the slide 35, which is connected to the guides 34 by motorized mechanisms 40 that enable positioning of the slide 35 in different positions with respect to the frame 31 and, in consequence, enable positioning the fluidization unit 36 at different depths in the broken-up ground mass, as better shown in FIG. 6. In this example, the guide vehicles 13 have the respective fluidization units 36 arranged at decreasing depths in the advancing direction D1 (FIG. 3), wherein the positions of the fluidization units 36 of FIG. 3 are purely indicative and the ideal position is determined by adjusting the position of the slides 35.

Each fluidization unit 36 comprises two tubular constructions 41 configured to be arranged on opposite sides of the pipeline 1, as shown in FIG. 5, and connected to each other by the guide device 42 to guide the pipeline 1 downwards and aid sinking the pipeline 1 into the fluidized ground mass. In the case shown in the accompanying drawings, the guide device 42 comprises a roller arranged in contact with the top part of the pipeline 1 and is movable in a motorized manner with respect to the guide vehicle 13 in both the advancing direction D1 and the burying direction D2.

Each tubular construction 41 comprises a series of tubes 43 and a tube 44 connected to the distal ends of tubes 43. The ends of tube 44 are bent so as to aid penetration of tube 44 into the broken-up ground mass in the advancing direction D1.

The guide vehicles 13 are connected to the control unit 16 by a suitable umbilical 45 (FIG. 3).

For further details on the guide vehicle 13, please make express reference to FIGS. 8 to 10D and the associated description from page 12, line 12 to page 14, line 11 of PCT Published Patent Application WO 2009/141,409, which are incorporated for reference in this description. It should be appreciated that the guide vehicle 13 differs from the burying vehicle of PCT Published Patent Application WO 2009/141,409 in that the maneuvering of the guide vehicle 13 is independent of the guide device 42.

Figure 7:
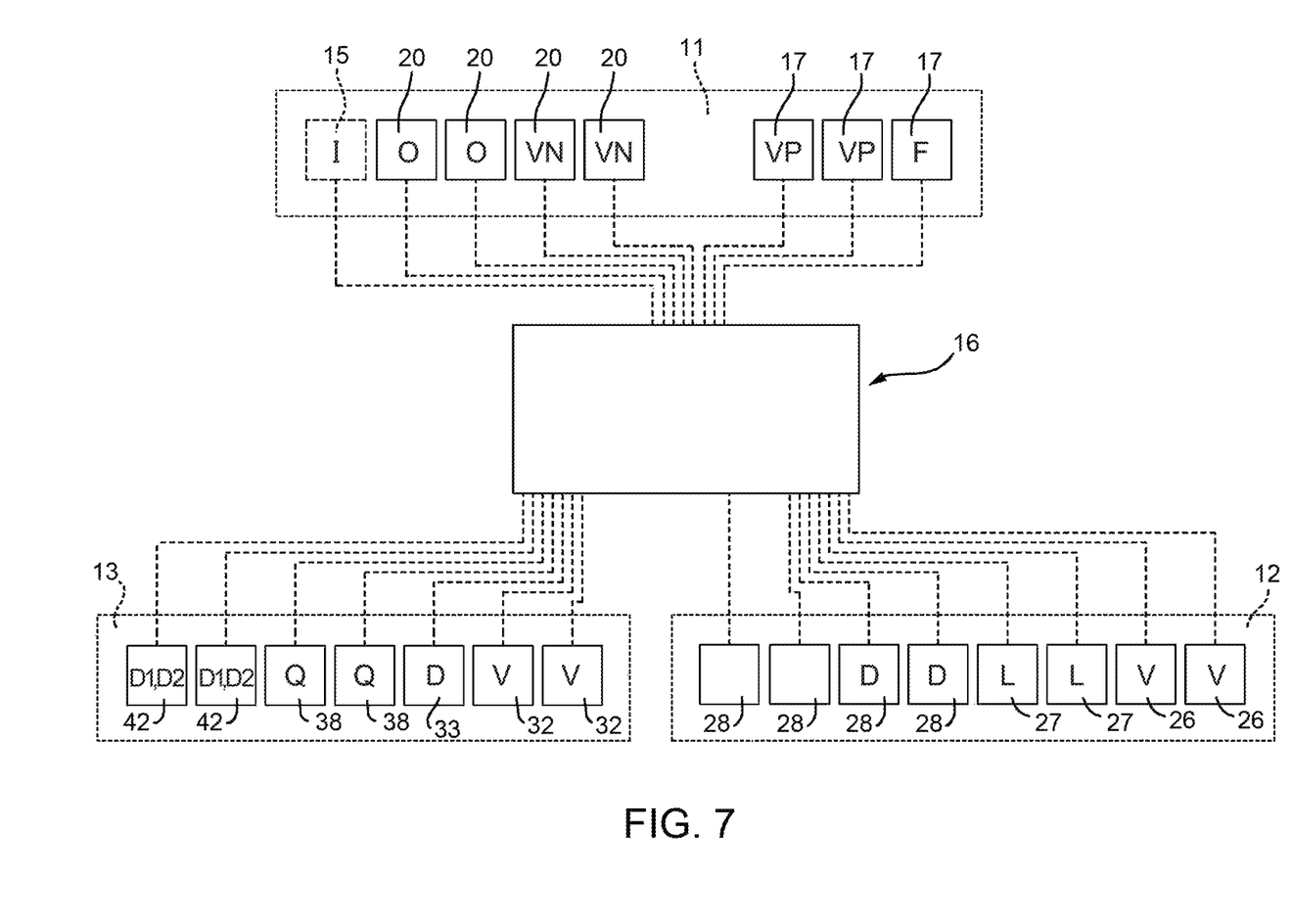
FIG. 7 is a diagram, with parts removed for clarity, of the control of the system forming the subject-matter of the present disclosure.

Referring to FIG. 7, the control unit 16 manages the laying and burying parameters of the pipeline 1 in an integrated manner. In particular, the control unit 16 manages the floating unit 11, the bed working vehicle 12, the guide vehicles 13, only one of which is shown in FIG. 7, and the tensioners 17, only one of which is shown in FIG. 7.

The integrated management involves the control of all the parameters and the coordinated operation of actuators to relatively quickly perform the burying operations of the pipeline 1 without excessively stressing the pipeline 1 (FIG. 3).

In particular, the following parameters are controlled on the bed working vehicle 12:

Advancing speed V by controlling the advancing speeds of each advancing device 26;

Advancing direction D1 by controlling the difference between the speeds of the advancing devices 26;

Working width L of the trench T by controlling the positioning of the tools 27 about the axes A1;

Depth D of the trench T by controlling the position of the slide 28 along the guides 29.

In particular, the control unit 16 controls the following parameters of the guide vehicle 13:

Advancing speed V of the guide vehicles 13 by controlling the speeds of the advancing devices 32;

Advancing direction D1 of the guide vehicle 13 by controlling the differential speeds of the advancing devices 32;

Depth D of the burying device 33;

Flow rate Q of the pumps 38; and

Position parallel to the advancing direction D1, and position parallel to the burying direction D2 of the guide device 42 with respect to the frame 31 of the guide vehicle 13.

Alternatively, the control unit 16 controls the force transmitted from the pipeline 1 to the guide device 42.

In particular, the control unit 16 controls at least one of the following parameters of the floating unit 11:

Advancing speed VN of the floating unit 11 by controlling the propeller of the thrusters 20;

Advancing direction O of the floating unit 11 by controlling the orientation of the thrusters 20;

Inclination I of the lay device 15 and, in consequence, the advancing direction D3 of the pipeline 1 on the floating unit 11;

Advancing speed VP of the pipeline 1 along the lay device by controlling the speed of the tensioners 17; and Tensile force F of the tensioners 17 on the pipeline 1.

The integrated management of the laying and burying parameters is defined based on design data that provides for burying the pipeline 1 along the predefined path P. The bed working vehicle 12 is advanced in the advancing direction D1 along the path P with an advancing speed equal to the slower speed between the average advancing speed of the laying operations and the average speed of working the bed permitted by the specific conditions of the bed 9. Other parameters such as the depth D and width L of the trench T follow design guidelines and affect the advancing speed V of the bed working vehicle 12.

The average speed of laying operations is generally dictated by the speed of assembly of the pipeline 1 on the floating unit 11.

The inclination of the lay device 15 is selected so as to result in an advancing direction D3 that forms a maximum angle of 40° with the advancing direction D1. The inclination of the lay device 15 is selected according to the depth of the bottom surface 22 of the trench T with respect to the level of the body of water 10. A considerable burying depth can significantly affect the overall depth with respect to the level of the body of water 10 due to the shallowness of the bed 9. In consequence, it is necessary to take the depth of the trench T into account, to plan the curved trajectory along which the pipeline 1 will be arranged in the laying operations.

Since the assembly operations of the pipeline 1 are performed stepwise, the control unit 16 controls the tensioners 17 so as to implement a stepwise advancement of the pipeline 1 in direction D3, and the guide vehicles 13 so as to advance the guide vehicles 13 stepwise as a function of the stepwise advancement of the pipeline 1 and the inclination I of advancing direction D3 with respect to advancing direction D1.

Due to the possibility of being positioned independently from the respective guide vehicles 13, the guide devices 42 enable guiding the pipeline 1 along a predetermined trajectory even in the event of non-optimal positioning of the guide vehicles 13. In consequence, the control unit 16 positions the guide devices 42 so as to keep the pipeline 1 as far as possible on the predetermined trajectory.

In practice, the integrated management enables keeping the pipeline 1 on the predetermined trajectory without imposing significant variations in curvature of the pipeline 1 ascribable to lack of coordination between the maneuvering of the floating unit 11, the tensioners 17, and the guide vehicles 13.

Figure 8:
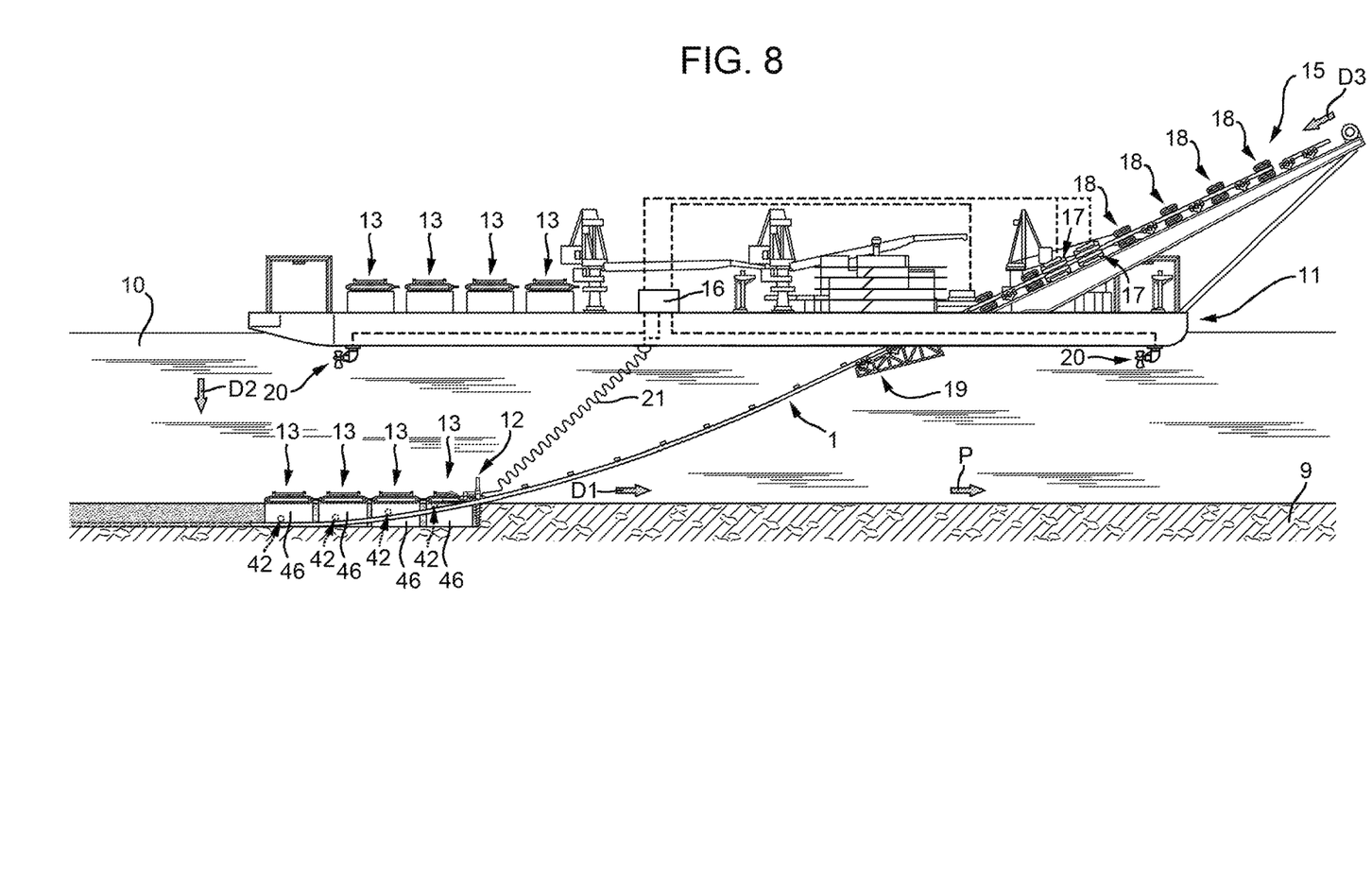
FIG. 8 is a sectional view, with parts removed for clarity, of an alternative embodiment of the system in FIG. 3.

In the variant in FIG. 8, the bed working vehicle 12 is placed directly in front of the guide vehicles 13. According to this configuration, the bed working vehicle 12 advances stepwise together with the guide vehicles 13.

In the case in point, the bed working vehicle 12 performs an excavation (i.e., breaks up the material of the bed 9 and removes the broken-up material from the trench T). The guide vehicles 13, in addition to being equipped with devices 42 of the type described with reference to FIG. 5, have lateral walls 46 configured to support the side surfaces 23 of the trench T until the moment when the pipeline 1 is rested on the bottom surface 22 of the trench T. Once the pipeline 1 has been laid, the cave-in of the trench T no longer supported by the lateral walls 46 completes the burying operations of the pipeline.

Finally, it should be appreciated that variants can be made regarding the present disclosure with respect to the embodiments described with reference to the accompanying figures without departing from the scope of the claims. Accordingly, various changes and modifications to the presently disclosed embodiments will be apparent to those skilled in the art. Such changes and modifications can be made without departing from the spirit and scope of the present subject matter and without diminishing its intended advantages. It is The invention is claimed as follows:

1. A method of burying a pipeline, the method comprising:
   making a trench with a bottom surface in a bed of a body of water by a bed working vehicle advanced in an advancing direction;
   advancing, substantially in the advancing direction, a floating unit in the body of water;
   controlling a release of the pipeline from the floating unit by at least one tensioner and along a tiltable lay device mounted on the floating unit such that the pipeline forms a single curve with an upward-facing concavity between the lay device and the bottom surface of the trench;
   guiding the pipeline to the bottom surface of the trench by a guide vehicle advanced, substantially in the advancing direction, along the trench;
   controlling the floating unit, the bed working vehicle, and the guide vehicle as a function of an advancement of the pipeline along the tiltable lay device to minimize stress along the pipeline in a section of the pipeline extending between the floating unit and the bottom surface of the trench;
   acquiring an average advancing speed of the pipeline along the tiltable lay device; and
   controlling an average advancing speed of the bed working vehicle and of the guide vehicle as a function of the acquired average advancing speed of the pipeline along the tiltable lay device.

2. The method of claim 1, wherein guiding the pipeline comprises coupling the guide vehicle to the pipeline by a guide device, the position of the guide device being adjustable with respect to the guide vehicle by at least one of: a force control and a position control.

3. The method of claim 2, wherein the guide device is adjustable in at least one direction between a direction parallel to the advancing direction and a burying direction perpendicular to the advancing direction.

4. The method of claim 1, wherein the pipeline comprises an external tubular portion which is discontinuous along the generatrices of the pipeline.

5. The method of claim 4, wherein the external tubular portion defines a plurality of rings alternating with a plurality of annular grooves.

6. The method of claim 4, wherein the external tubular portion defines a helical groove and a series of coils separated from each other by the helical groove.

7. A pipeline burying system comprising:
   a bed working vehicle advanceable in an advancing direction and configured to make a trench with a bottom surface in a bed of a body of water;
   a floating unit advanceable in the body of water substantially in the advancing direction;
   a tiltable lay device mounted on the floating unit such that responsive to the pipeline advancing along the tiltable lay device, the pipeline forms a single curve with an upward-facing concavity between the tiltable lay device and the bottom surface of the trench;
   at least one tensioner configured to control a release of the pipeline;
   a guide vehicle advanceable along the trench substantially in the advancing direction and configured to guide the pipeline to the bottom surface of the trench; and
   a control unit configured to:
      control the floating unit, the bed working vehicle, and the guide vehicle as a function of the advancement of the pipeline along the tiltable lay device to minimize stress along a section of the pipeline extending between the floating unit and the bottom surface of the trench,
      acquire an average advancing speed of the pipeline along the tiltable lay device, and
      control an average advancing speed of the bed working vehicle and the guide vehicle as a function of the acquired average advancing speed of the pipeline along the tiltable lay device.

8. The pipeline burying system of claim 7, wherein the guide vehicle comprises a guide device configured to be coupled to the pipeline and which is controllable, by the control unit, in at least one of a force a position with respect to the guide vehicle.

9. The pipeline burying system of claim 8, wherein the guide device is adjustable in at least one direction between a direction parallel to the advancing direction and a burying direction perpendicular to the advancing direction.

10. The pipeline burying system of claim 7, wherein the pipeline comprises an external tubular portion which is discontinuous along the generatrices of the pipeline.

11. The pipeline burying system of claim 10, wherein the external tubular portion defines plurality of rings alternating with a plurality of annular grooves.

12. The pipeline burying system of claim 10, wherein the external tubular portion defines a plurality of coils and a helical groove defining the coils.

13. A method of burying a pipeline, the method comprising:
   making a trench with a bottom surface in a bed of a body of water by a bed working vehicle advanced in an advancing direction;
   advancing, substantially in the advancing direction, a floating unit in the body of water;
   controlling a release of the pipeline from the floating unit by at least one tensioner and along a tiltable lay device mounted on the floating unit such that the pipeline forms a single curve with an upward-facing concavity between the lay device and the bottom surface of the trench;
   guiding the pipeline to the bottom surface of the trench by a guide vehicle advanced, substantially in the advancing direction, along the trench;
   controlling the floating unit, the bed working vehicle, and the guide vehicle as a function of an advancement of the pipeline along the tiltable lay device to minimize stress along the pipeline in a section of the pipeline extending between the floating unit and the bottom surface of the trench; and
   controlling the advancing of the bed working vehicle and the guide vehicle in synchronism with the advancing of the pipeline along the tiltable lay device.

14. The method of claim 13, wherein guiding the pipeline comprises coupling the guide vehicle to the pipeline by a guide device, the position of the guide device being adjustable with respect to the guide vehicle by at least one of: a force control and a position control.

15. The method of claim 14, wherein the guide device is adjustable in at least one direction between a direction parallel to the advancing direction and a burying direction perpendicular to the advancing direction.

16. The method of claim 13, wherein the pipeline comprises an external tubular portion which is discontinuous along the generatrices of the pipeline.

17. The method of claim 16, wherein the external tubular portion defines a plurality of rings alternating with a plurality of annular grooves.

18. The method of claim 16, wherein the external tubular portion defines a helical groove and a series of coils separated from each other by the helical groove.

19. A method of burying a pipeline, the method comprising:
making a trench with a bottom surface in a bed of a body of water by a bed working vehicle advanced in an advancing direction;
advancing, substantially in the advancing direction, a floating unit in the body of water;
controlling a release of the pipeline from the floating unit by at least one tensioner and along a tiltable lay device mounted on the floating unit such that the pipeline forms a single curve with an upward-facing concavity between the lay device and the bottom surface of the trench;
guiding the pipeline to the bottom surface of the trench by a guide vehicle advanced, substantially in the advancing direction, along the trench; and
controlling the floating unit, the bed working vehicle, and the guide vehicle as a function of an advancement of the pipeline along the tiltable lay device to minimize stress along the pipeline in a section of the pipeline extending between the floating unit and the bottom surface of the trench, wherein floating unit advances in synchronism with the advancing of the pipeline along the tiltable lay device.

20. The method of claim 19, wherein guiding the pipeline comprises coupling the guide vehicle to the pipeline by a guide device, the position of the guide device being adjustable with respect to the guide vehicle by at least one of: a force control and a position control.

21. The method of claim 20, wherein the guide device is adjustable in at least one direction between a direction parallel to the advancing direction and a burying direction perpendicular to the advancing direction.

22. The method of claim 19, wherein the pipeline comprises an external tubular portion which is discontinuous along the generatrices of the pipeline.

23. The method of claim 22, wherein the external tubular portion defines a plurality of rings alternating with a plurality of annular grooves.

24. The method of claim 22, wherein the external tubular portion defines a helical groove and a series of coils separated from each other by the helical groove.

25. A pipeline burying system comprising:
a bed working vehicle advanceable in an advancing direction and configured to make a trench with a bottom surface in a bed of a body of water;
a floating unit advanceable in the body of water substantially in the advancing direction;
a tiltable lay device mounted on the floating unit such that responsive to the pipeline advancing along the tiltable lay device, the pipeline forms a single curve with an upward-facing concavity between the tiltable lay device and the bottom surface of the trench;
at least one tensioner configured to control a release of the pipeline;
a guide vehicle advanceable along the trench substantially in the advancing direction and configured to guide the pipeline to the bottom surface of the trench; and
a control unit configured to:
control the floating unit, the bed working vehicle, and the guide vehicle as a function of the advancement of the pipeline along the tiltable lay device to minimize stress along a section of the pipeline extending between the floating unit and the bottom surface of the trench, and
control the advancement of the bed working vehicle and the guide vehicle in synchronism with the advancement of the pipeline along the tiltable lay device.

26. The pipeline burying system of claim 25, wherein the guide vehicle comprises a guide device configured to be coupled to the pipeline and which is controllable, by the control unit, in at least one of a force a position with respect to the guide vehicle.

27. The pipeline burying system of claim 26, wherein the guide device is adjustable in at least one direction between a direction parallel to the advancing direction and a burying direction perpendicular to the advancing direction.

28. The pipeline burying system of claim 25, wherein the pipeline comprises an external tubular portion which is discontinuous along the generatrices of the pipeline.

29. The pipeline burying system of claim 28, wherein the external tubular portion defines plurality of rings alternating with a plurality of annular grooves.

30. The pipeline burying system of claim 28, wherein the external tubular portion defines a plurality of coils and a helical groove defining the coils.

31. A pipeline burying system comprising:
a bed working vehicle advanceable in an advancing direction and configured to make a trench with a bottom surface in a bed of a body of water;
a floating unit advanceable in the body of water substantially in the advancing direction;
a tiltable lay device mounted on the floating unit such that responsive to the pipeline advancing along the tiltable lay device, the pipeline forms a single curve with an upward-facing concavity between the tiltable lay device and the bottom surface of the trench;
at least one tensioner configured to control a release of the pipeline;
a guide vehicle advanceable along the trench substantially in the advancing direction and configured to guide the pipeline to the bottom surface of the trench; and
a control unit configured to:
control the floating unit, the bed working vehicle, and the guide vehicle as a function of the advancement of the pipeline along the tiltable lay device to minimize stress along a section of the pipeline extending between the floating unit and the bottom surface of the trench, and
control the advancement of the floating unit in synchronism with the advancement of the pipeline along the tiltable lay device.

32. The pipeline burying system of claim 31, wherein the guide vehicle comprises a guide device configured to be coupled to the pipeline and which is controllable, by the control unit, in at least one of a force a position with respect to the guide vehicle.

33. The pipeline burying system of claim 32, wherein the guide device is adjustable in at least one direction between a direction parallel to the advancing direction and a burying direction perpendicular to the advancing direction.

34. The pipeline burying system of claim 31, wherein the pipeline comprises an external tubular portion which is discontinuous along the generatrices of the pipeline.

35. The pipeline burying system of claim 34, wherein the external tubular portion defines plurality of rings alternating with a plurality of annular grooves.

36. The pipeline burying system of claim 34, wherein the external tubular portion defines a plurality of coils and a helical groove defining the coils.

* * * * *